United States Patent [19]

Simpson

[11] Patent Number: 4,480,628
[45] Date of Patent: Nov. 6, 1984

[54] FUEL EFFICIENT OVEN

[75] Inventor: Thomas W. Simpson, Rochester, Mich.

[73] Assignee: Solaronics, Inc., Rochester, Mich.

[21] Appl. No.: 448,975

[22] Filed: Dec. 13, 1982

[51] Int. Cl.³ .................. A21B 1/00; F24C 1/00
[52] U.S. Cl. .................. 126/21 A; 126/92 C; 126/246; 219/400; 312/236
[58] Field of Search .......... 126/21 A, 21 R, 118, 126/246, 92 C, 110 D, 113, 110 R; 219/400, 246, 268; 312/236; 165/164

[56] References Cited

U.S. PATENT DOCUMENTS

| | | | |
|---|---|---|---|
| 1,755,727 | 4/1930 | Cramer | 126/92 C |
| 2,410,881 | 11/1946 | Hunter | 126/118 |
| 3,614,923 | 10/1971 | Thompson | 126/21 R |
| 3,658,047 | 4/1972 | Happel | 126/21 A |
| 3,836,220 | 9/1974 | Ishammar | 312/286 |
| 3,895,215 | 7/1975 | Gordon | 126/21 A |
| 3,908,749 | 9/1975 | Williams | 165/2 |
| 4,030,476 | 6/1977 | Hock | 126/246 |
| 4,039,776 | 8/1977 | Roderick | 126/21 A |
| 4,126,775 | 11/1978 | Wyatt | 219/400 |
| 4,233,495 | 11/1980 | Scoville et al. | 219/400 |

FOREIGN PATENT DOCUMENTS 2422186 11/1975 Fed. Rep. of Germany ... 126/21 A
2709068 9/1978 Fed. Rep. of Germany ... 126/21 A Primary Examiner—James C. Yeung
Attorney, Agent, or Firm—Watts, Hoffmann, Fisher & Heinke

[57] ABSTRACT

A heat exchanger for use with a portable oven. The disclosed heat exchanger maximizes the conversion of heat caloric content of a combustible fuel to useable heat energy. A gas fueled infra-red burner mounted above the heat exchanger directs radiant energy toward a metal plate which also is contacted by waste or effluent from the burner. The metal plate in turn transmits heat by conduction to a sealed passageway or flow path through which air circulates on its way to the oven. By heating the plate with both effluent and radiation approximately 70% of the heat caloric content of the gas fuel is converted to heat energy for heating air in the passageway. Use of a sealed passageway allows conditions inside the oven to be controlled to make the oven suitable for use as a test oven.

9 Claims, 9 Drawing Figures

FUEL EFFICIENT OVEN

TECHNICAL FIELD

The present invention relates to a heat exchange method and apparatus and more particularly to an oven heater having a particularly efficient heat exchange unit.

BACKGROUND ART

A variety of portable heating cabinets suitable for heating food are known in the art. Ovens used in the catering industry, for example, allow cooking to be done in the oven at a location other than where the food is consumed. One portable oven design includes a removable heating unit which can be replaced with an insulating top which retains the heat supplied by the heating unit. The portable cabinet can be transferred from one location to another without loss of heat and has utility in any application where a portable heating or cooking unit is required.

One proposal for a food heating cabinet includes a top mounted unit for heating air and circulating the heated air throughout the cabinet. Heated air from the heating unit is forced into a plenum and then into the interior of the cabinet. Such a unit requires a source of heat and a mechanism for delivering heated air to the plenum. One method of heating the air is to convert an electric current into heat energy by joule heating.

It has been suggested, however, that joule heating with electric heating elements may not be the most efficient technique for heating the air. The electric potential energy conversion to heat and the subsequent transfer of this heat to air forced through the oven results in no better than a 50% conversion of the potential energy to useable heat energy. Conventional propane or natural gas sources of energy are no more efficient in heat generation. One goal therefore, in designing an oven for heating foods, be it portable or otherwise, is efficiency in converting latent fuel energy to heat energy.

A separate concern is control over the environment in which the food is cooked. It can be desirable, for example, to control the humidity of the air which contacts the food so that a desired end result is obtained. Control over conditions inside the oven is also important in test ovens where an inert or other controlled atmosphere is necessary and must be maintained throughout oven operation. It is apparent therefore that there exists a need to provide an energy efficient heating operation to both portable and stationary ovens where the environment inside the oven can be controlled.

DISCLOSURE OF THE INVENTION

The present invention relates to a heat exchange unit suitable for use in either a stationary or a movable oven. In addition to promoting efficient heat conversion, the disclosed oven uses a sealed hot air flow path so that humidity, for example, can be carefully maintained within a desired range. The invention has particular applicability to an oven which is portable so that food can be cooked in one location, the heat exchange unit removed from the oven and replaced with a heat insulating material and the oven moved to a different location for food service and consumption.

In accordance with the invention the improved heat exchange unit defines first and second heating zones having a common boundary for conduction of heat between those zones. In a first of the zones a source of radiant energy is positioned to radiate energy into that zone. The source of radiant energy also produces a heated effluent which also flows through the first zone. Positioned inside this first zone are heat transfer elements connected to the common boundary between the zones so that radiated heat from the source as well as convection heat from the effluent heats both the heating elements and the boundary. The boundary, in turn, heats air in the second zone and a blower moves heated air away from the boundary. The second zone is connected to a cooking portion of the oven so that the air forced through the second zone heats food inside the oven.

If the source of radiant energy is effective in converting latent fuel energy into heat energy the present apparatus can be quite efficient in transferring heat to the second zone. In particular if the source of radiant energy is an infra-red gas fired burner which produces a heated effluent, the heat transfer elements are heated by not only radiant energy from the source, but also by the heated effluent or waste products produced by the source. With this technique energy conversion efficiencies of at least 70% are achievable. The infra-red source transmits at least 50% of the fuel caloric value of the fuel by radiation and 20 to 30% more is transmitted by convection to achieve conversion efficiencies in the 70 to 80% range.

The design of the boundary between the first and second zones is particularly suited for transfer of heat energy from the first zone to the second. In the first zone a plurality of heat transfer elements are coupled to the boundary such that they extend upwardly toward the source of radiant energy so that they are directly radiated by the infra-red gas burner as well as conduction heated by the effluent. On the opposite side of the boundary are a number of additional heat transfer elements which promote heat transfer from the boundary to the air moving through the second zone. The preferred heat transfer elements in the first and second zones are elongated fins which extend away from the boundary. In the first zone they are heated by the source and in the second zone they heat air moving toward the oven.

In accordance with a preferred embodiment of the invention the heat exchanger forms a part of a removable top to a movable oven so that food inside the oven can be cooked to a desired degree prior to removal of the heat exchanger. The heat exchanger is then replaced with an insulating unit which maintains oven temperature high enough to allow the food inside the oven to continue to cook or at least remain at a raised temperature.

In addition to the efficiencies with regard to heat exchange from the radiant source to the oven, the present design allows the atmostphere inside the oven to be continuously controlled. The design has a closed path through which the heated air is forced by one or more fans mounted to circulate air through the second zone as well as through the oven itself. Humidity inside the oven can be maintained since neither effluent from the source nor air from any other source is introduced into the circulating air.

From the above it should be appreciated that one object of the present invention is the design of an improved, high efficient heat exchange unit suitable for use as an oven's heat source. The unit achieves an efficiency in converting fuel heat content to useable heat unachieved by the prior art. These and other objects and advantages of the invention will become better understood when a preferred embodiment of the invention is disclosed in conjuction with the accompanying drawings.

BEST MODE FOR CARRYING OUT THE INVENTION

Figure 1:
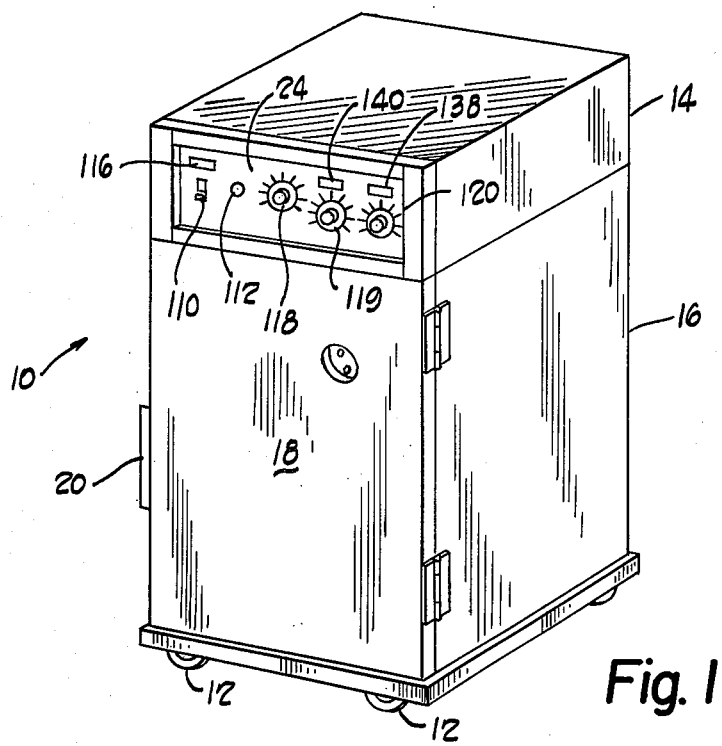
FIG. 1 is a perspective view of an oven including a detachable heating unit.

Turning now to the drawings, there is illustrated a portable oven 10 which in the disclosed embodiment is mounted to casters 12 so that the oven can be easily moved from one place to another. This capability allows food to be heated and cooked in one location and served in a separate location remote from the position in which the food is cooked.

The oblong shaped oven 10 is divided into two segments or portions, a heating unit 14 and a cooking or warming unit 16. The cooking unit 16 defines a chamber bounded on three sides by walls and on a fourth side by a hinged door 18 with a latch 20 for opening and closing the door. The bottom of the cooking unit 16 is closed while the top is open so that either the heating unit 14 or an insulating cover (not shown) encloses the top of the heating chamber.

The temperature of air inside the chamber is elevated by a source of heat energy mounted inside the heating unit 14. In the preferred embodiment of the invention the source comprises a gas fired infra-red burner 30 (see FIG. 2) which heats air inside the heating unit 14 for delivery to the chamber inside the cooking unit 16. A control panel 24 enables the oven user to control the temperature of the oven as well as the time duration cooking takes place.

One feature of the disclosed apparatus is that the heating unit 14 is removable from the cooking unit 16. Once food inside the cooking unit 16 has been cooked, the heating unit 14 can be removed and replaced with an insulating top (not shown) which maintains food inside the cooking unit 16 at an elevated temperature as the oven portion is moved to a location where the food is to be served.

Figure 2:
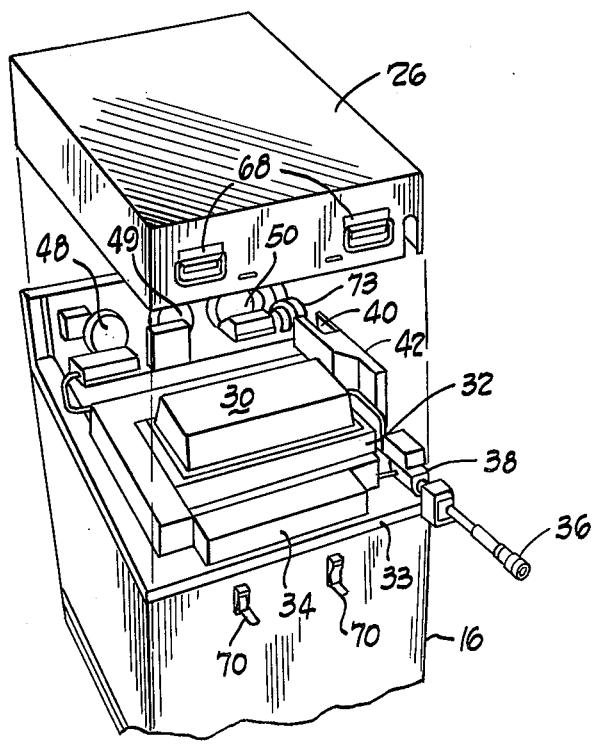
FIG. 2 is an enlarged perspective view of the FIG. 1 oven with a top cover removed to show the elements of the heating unit.

FIG. 2 shows the heating unit 14 with a cover 26 removed so that the interior of the heating unit can be viewed. The heating unit 14 comprises a burner 30 mounted on top of a heat exchanger 32 which directs heated air through a duct 34 to the heating chamber inside the oven. The preferred burner 30 comprises a gas fired infra-red burner so that gas is routed into the heating unit 14 via a gas coupling 36. The rate at which gas is delivered to the burner is controlled by a valve 38 which is opened and closed by a temperature controller to be described. A combustion fan 40 routes air through a duct 42 to provide oxygen to the burner 30 to burn the gas entering the burner.

Figure 3:
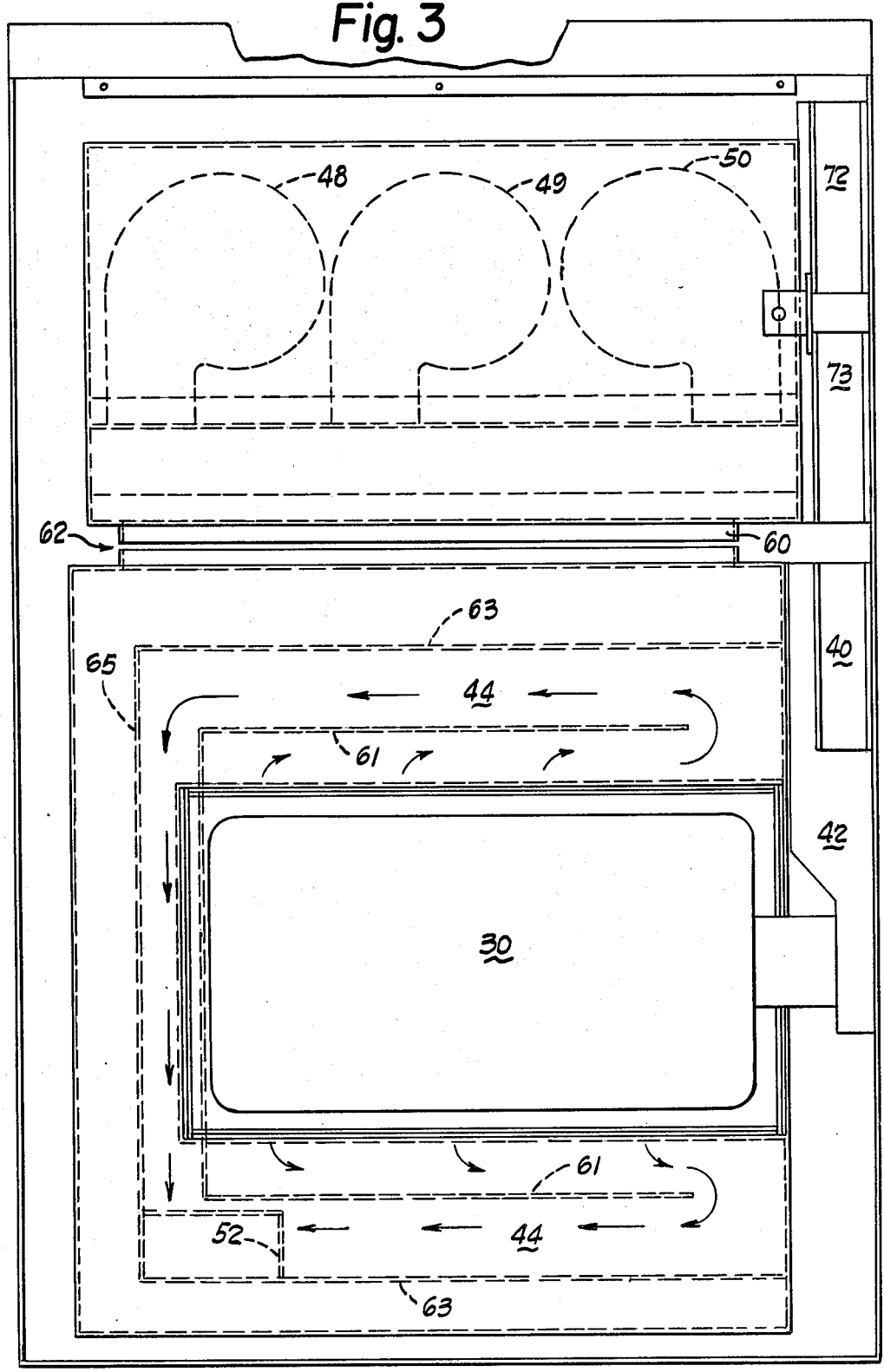
FIG. 3 is a plan view of the heating unit with certain elements shown in outline only for clarity of illustration.
Figure 4:
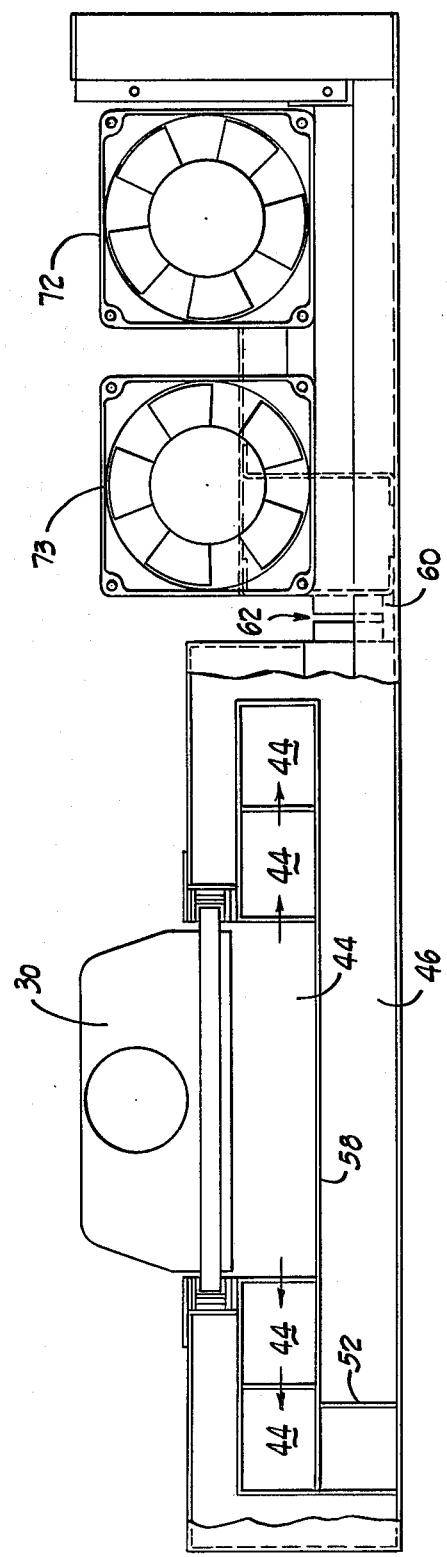
FIG. 4 is a partially sectioned elevational view of the heating unit with heating fins mounted inside a heat exchanger deleted for clarity of illustration.

The heat exchanger 32 supports the burner 30 and in turn is mounted to a bottom plate 33 of the heating unit 14. The exchanger defines first 44 and second 46 enclosures or heating zones (FIG. 4) through which heated air moves. The combustion fan 40 moves air through the first zone 44 and three circulating air fans 48–50 (see FIG. 3) move air through the second zone 46. The infra-red gas burner 30 produces a waste product or effluent which is discharged into the air inside the first or top heating zone 44 and which is routed along a serpentive path to an exhaust duct 52. The combination of heated effluent and air is referred to as flue gas.

Figure 5A:
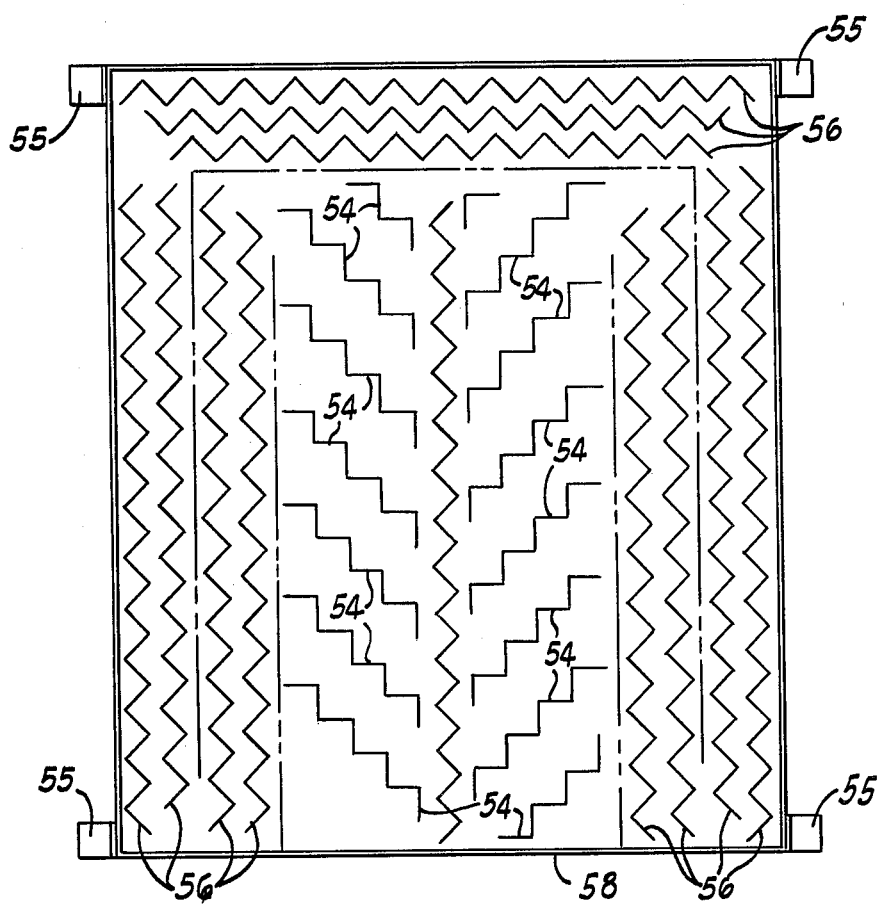
FIG. 5A is a top plan view of a heat exchanger plate assembly.
Figure 5B:
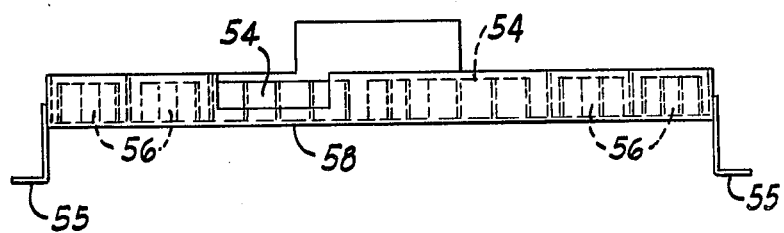
FIG. 5B is an elevation view of that portion of the plate with bottom heating fins deleted.

A metal plate 58 defines a boundary between the two zones 44, 46. A plurality of flue gas fins 54, 56 (see FIG. 5A) are mounted (by welding) to a top surface of the plate 58. A first grouping of these fins 54 are diagonally oriented with respect to the others 56 and are mounted directly beneath the burner 30. These fins 54 are heated by two heat transfer mechanisms in that they receive radiant energy from the burner 30 as well as receive heat by convection from the effluent produced during the combustion process. The remaining flue gas fins 56 are also welded to the common boundary 58 but are positioned to the sides of the burner. In a preferred embodiment of the invention, both groups of flue gas fins 54, 56 extend a height of approximately 1" above the boundary 58. This construction allows an efficient transfer of heat energy by the burner 30 to the plate 58 separating the first and second heating zones. The plate 58 is supported to a bottom of the heat exchanger with a number of mounting tabs 55.

In operation, the burner 30 directs radiant heat energy away from its bottom surface toward the first group of flue gas fins 54 as well as the plate 58. Up to about 50% of the heat caloric content of the gas used to fire the burner 30 is transferred to the plate 58. By directing the effluent to both groups of flue gas fins 54, 56 as well as the plate 58, an additional 20 to 30% of heat transfer of the original caloric content of the gas is achieved.

As noted above, the effluent is forced past the flue gas fins 54, 56, by the combustion fan 40 and directed to an exhaust duct 52 where it exits the rear of the heating unit 14. Prior to exiting the heat exchanger 32 the flue or combustion gases are routed along a winding path (see arrows in FIG. 3) defined by walls 61, 63, 65 bounding the first zone 44. As seen most clearly in FIG. 4 the first chamber is surrounded by the second chamber 46 so that the temperature of the flue gases has been reduced to approximately the temperature of the air inside the second chamber or enclosure 46 prior to reaching the flue exhaust duct 52.

The second heating zone or chamber 46 surrounds much of the first chamber 44 and defines a passageway through which air is routed by circulating air fans 48–50. The communication between the second heating zone or chamber 46 and the circulating fans 48–50 is through a duct 60 from the fans to the heat exchanger 32. The construction of the heating unit 14 is such that the heat exchanger 32 and infra-red burner 30 can be removed from the unit without necessitating a movement of the circulating fans 48-50. The duct 60 defines a ⅛" gap 62 which is sealed by a flexible ring, which in the preferred embodiment of the invention, comprises a fibrax ring which is held in place by a steel clip (not shown). To remove the heat exchanger 32 (and accompanying burner) the clip is removed, the seal or ring is then removed and the fasteners (not shown) holding the heat exchanger to the bottom plate 33 loosened so the whole exchange can be lifted from the heating unit.

As the common boundary or plate 58 between the two heating chambers 44, 46 heats up, the air inside the second chamber 46 comes in contact with the plate and is heated by convection heating. The air which is forced through the second chamber 46 and out the duct 34 to the cooking unit 16. The exhaust or effluent from the burner 30 never reaches the second heating chamber 46 so that humidity and environmental control over the oven portion of the unit is possible.

Figure 6A:
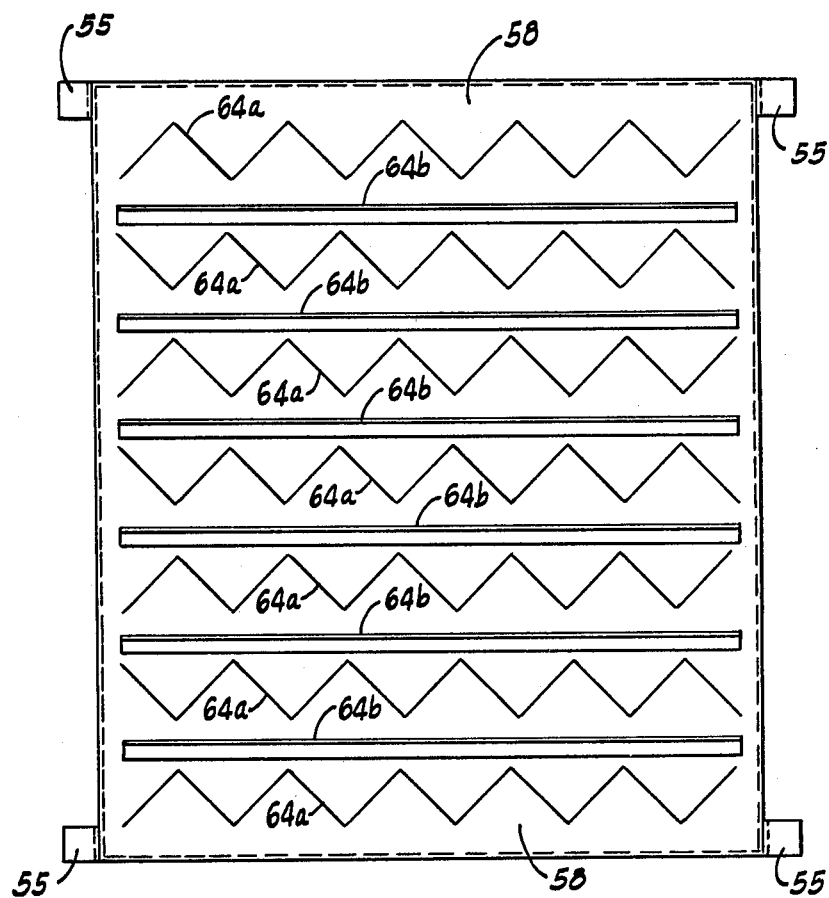
FIG. 6A is a bottom plan view of the heat exchanger plate.
Figure 6B:
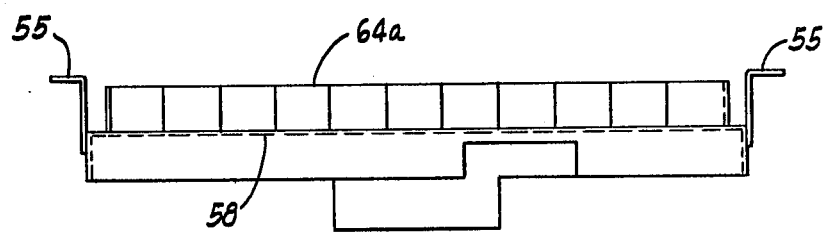
FIG. 6B is an elevation view of the plate with top heating fins deleted.

To improve the heat transfer characteristics of the heat exchanger 32, a plurality of metal hot air fins 64 are mounted (by welding) to the metal plate 58. Two different designs 64a, 64b for these hot air fins are utilized in the preferred embodiment of the invention. A first type of hot air fin 64a defines a zig-zag pattern across the width of the plate 58 (FIG. 6). A second 64b of the hot air fin designs comprises an elongated member which extends between the zig-zag pattern fins across the width of the plate 58. A preferred design includes six of the zig-zag design fins and six of the elongated fins.

The circulating air fans 48-50 force the air, which has been heated by convection contact with the hot air fins 64, through the hot air duct 34 to the oven chamber. The construction and design of the oven chamber is not critical for the present invention. Various designs are known in the art and so long as their exists a routing scheme through which the heated air can be forced into the oven, the present heat exchanger in combination with the radiant burner should prove to be an efficient mechanism of heating air within the unit.

This efficiency is enhanced if the oven chamber is itself insulated to avoid heat loss through the walls of the cooking unit 16. An inefficient design of the cooking chamber can offset the efficiencies of the heat exchanger and reduce the effectiveness of the present invention.

The disclosed heating unit 14 and cooking unit 16 define a closed air path to facilitate use of the oven 10 as a test oven. Air is directed from the fans 48-50 through the second zone 46 to the chamber inside the cooking unit 16 and back to the fans 48-50. The heated effluent from the burner 30 never interacts with this air and as long as the door 18 is not opened the interior of the oven chamber can be used as a test chamber.

As mentioned previously, the entire heating unit 14 can be separated from the oven and replaced by an insulating cover which allows food inside the oven portion to remain heated as the oven is moved to a different location. The heating unit 14 has a cover 26 with two handles 68 which are held in place by two latch mechanisms 70 mounted to the cooking unit 16. The latching mechanism 70 can be readily loosened enabling the heating unit 14 to be lifted from the oven and replaced by the insulating top cover.

During operation of the present heating unit, the circulating air fans 48-50 can overheat. A pair of electrical area cooling fans 72, 73 are mounted inside the heating unit 14 to direct cool air across the interior of the heating unit 14 and in particular across that portion of the heating unit where the circulating air fans 48-50 are located.

With the disclosed heat exchanger design, overheating of the fans 48, 50 is less of a problem since the hot gas from the burner is partially bounded by the cooler gas circulating through the oven. This feature in combination with the installation of one inch thick insulation of glass wool covered with aluminum foil over the heat exchanger allows the fans 48, 50 to be cooled with only one fan 72. In this alternate embodiment a second cooling fan 73 can be used as a combustion fan and the combustion fan 40, seen in FIG. 3, can be dispensed with.

Certain modifications of the present unit could be made without changing the heating characteristics embodied by the heat exchanger 32. One possibility is to modify the design of the exhaust duct 52 to route flue gases through a duct along the interior of the cooking unit 16 to allow the heated air and effluent carried by this duct to be cooled to a temperature no higher than the temperature inside the oven. This design modification requires the hot air duct to experience one right angle bend and extend downward into the oven portion of the unit. It should be appreciated, however, that if the heating unit 14 is to be removable from the cooking unit 16, this hot air duct must be separable at the juncture where the duct passes from the heating unit 14 into the cooking unit 16.

Although not shown in the drawings, the construction and design of the present unit could be modified to include an insulating material around the exterior of the burner 30 to reduce the temperature of the heating unit. The addition of this insulation, however, would not change the performance of the heat exchanger which comprises a primary feature of the present invention.

It should also be appreciated that so long as the burner 30 produces a heated effluent which can be routed over the flue gas fins inside the first hot air chamber, the choice of the burner 30 is not critical to the invention. The preferred embodiment of the present invention utilizes a Model No. C131074 infra-red gas fired burner, designed and manufactured by the Assignee of the present invention.

The preferred burner uses a spark ignitor which is mounted to a wall portion of the first heating chamber. An ignitor electrode 74 (shown schematically in FIG. 7) extends through the wall portion to a position beneath the burner to provide a spark which ignites the burner. The present unit also comprises a flame probe to insure that the ignitor has succeeded in lighting the burner. A flame electrode 76 extends from the wall of the first heating chamber to the interior of the first heating chamber to a position beneath the burner 30. This flame electrode carries an alternating current signal, which a flame will rectify into a DC signal which in turn can be monitored to determine whether a flame exists.

The functioning of the heating unit 14 will be described in conjunction with a schematic representation of the control panel 24 and a wiring schematic shown in FIG. 7. The control panel 24 allows the oven user to adjust the oven temperature in both a roast condition and a holding condition. The user also controls how long the oven stays at the roast temperature before dropping to the lower holding temperature.

Figure 7:
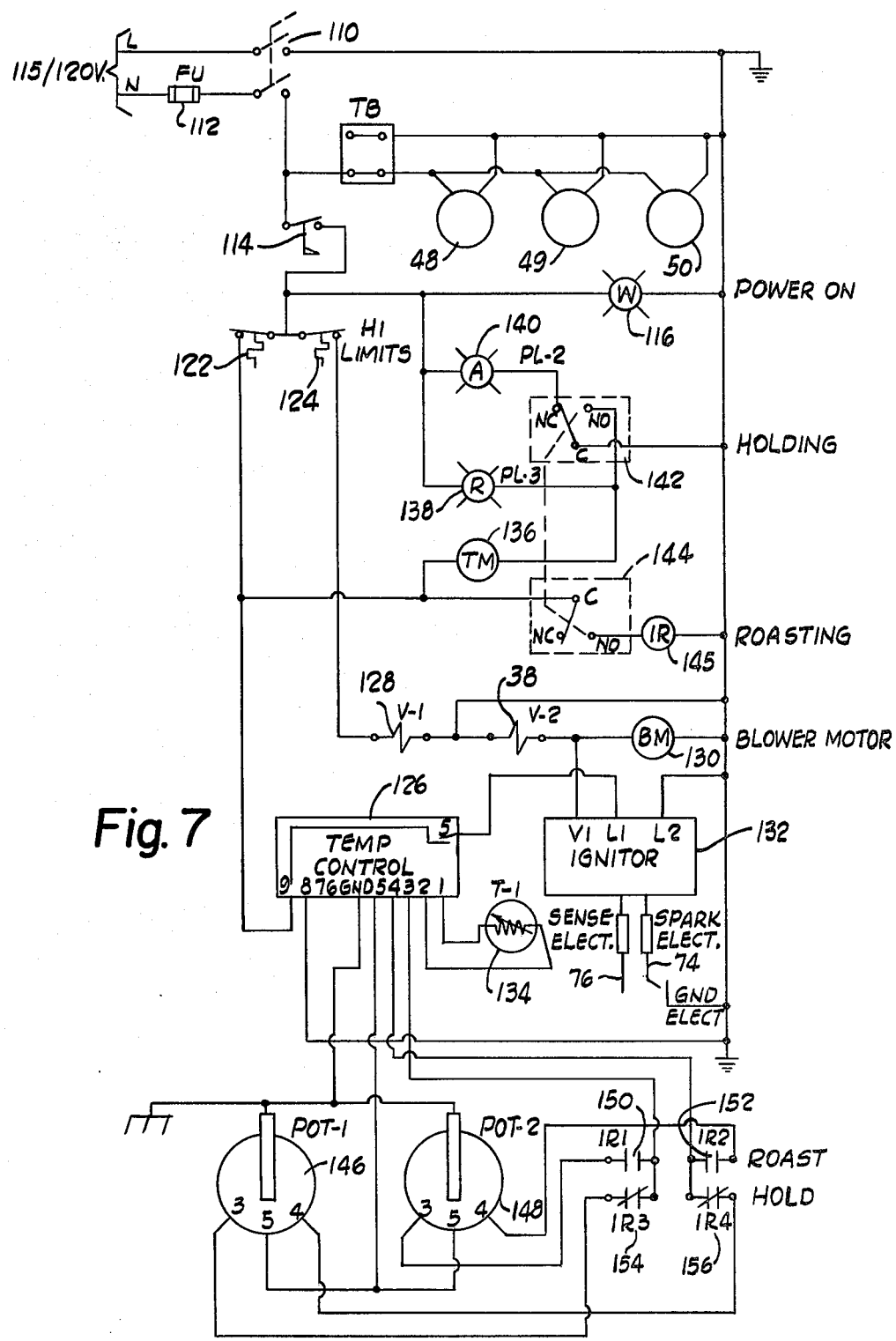
FIG. 7 is an electrical schematic showing the wiring of the components comprising the heating unit.

To initiate operation of the oven unit the user closes an on/off switch 110 which transmits 115 volt power to the circuit shown in the FIG. 7 schematic. Overload current conditions are avoided by a fuse 112 between the line voltage and the switch 110. The three dials 118-120, seen to the right of the fuse 112 in FIG. 1, allow the user to adjust the time period the oven is to maintain itself in a roast condition, allow the user to adjust the temperature of the oven in a so-called hold state, and allow the user to adjust the temperature in the roast condition.

Closing the switch 110 completes a circuit which energizes the circulating air fans 48-50 causing those fans to direct air through the closed path conduit leading through the heating unit to the oven. An air flow switch 114 senses the air flow produced by the fans 48-50. Unless the switch 114 senses that air flow, it remains open and the burner cannot light. Assuming this flow switch 114 senses an air flow through the oven, it closes causing a power-on light 116 to turn on indicating the fans are operating and the cooking unit 16 is ready to function.

Two high limit switches 122, 124 must close before the oven will light. The first of these switches 122 is coupled to pin 9 of a temperature control unit 126 to energize the temperature control unit. The first high limit switch 122 closes if the temperature in the oven is below 400° F. The second of the two high limit switches 124 closes if the temperature inside the oven is under 435° F. Once the switch 124 closes, a solenoid actuated valve 128 opens. It is seen, however, that this valve 128 is in series with the gas valve 38 so that no gas reaches the burner until this valve 38 is also opened. The valve 38 is opened at the same time a blower motor 130 in the fan 110 is energized to direct air from the combustion fan 40 to the burner 30.

The temperature controller 126 dictates when the burner is to light. Pin 5 of the controller 126 is coupled to terminal L1 of an ignitor 132. When terminal L1 receives a signal from the controller 126, it initiates a spark at the spark electrode 74 and simultaneously opens the valve 38 and energizes the blower motor 130. If a flame is sensed by the sensing electrode 76 within four seconds, the spark at the spark electrode is terminated and the burner 22 operates until a thermister temperature sensor 134 positioned inside the oven sends an indication to the controller 126 that the oven has been heated to a predetermined temperature. Once this occurs the contacts 7 and 5 on the temperature controller 126 open thereby closing the gas valve 38 until a next call for heat is received from the thermister 134. The temperature controller 126, ignitor 132, and thermister 134 are all available from the Fenwal Company under part nos. 19-404-007-100, 05-142401-001, and 28-230803-302 respectively.

In addition to transmitting power to the light 116, the air flow switch 114 energizes a timer 136, a roasting light 138, and a holding light 140. The roasting light 138 is energized whenever a roasting time up to a maximum of 14 hours has been set on the timer 136 by adjusting a knob 118 on the front panel 24. The timer 136 opens and closes two switches 142, 144 which dictate which of the two lights 138, 140 is energized as well as which of two potentiometer controls 146, 148 connected to the control dials 119, 120 determines the temperature inside the oven.

At any setting other than zero the timer 136 energizes the roasting light 138 and also energizes a relay 145 which closes normally open contacts 150, 152 to cause a second 148 of the two potentiometer controls to dictate oven temperature. The setting on this potentiometer is adjusted with the dial 120 on the panel 24. So long as the timer 136 indicates an unexpired roasting time, the potentiometer setting on the second potentiometer 148 is transmitted to temperature controller 126 which in turn through operation of the sensor 134 controls burner actuation in an on/off cycle.

When the timer times out, the switch 142 switches to energize the amber light 140 indicating that the oven is operating in a holding mode. The second switch 144 de-energizes the relay 145 so the normally open contacts 150, 152 now open and the normally closed contacts 154, 156 close. Closing of these two contacts transfers control of the oven temperature to a second potentiometer 146. The potentiometer 146 is connected to the dial 119 which the user has adjusted to choose a holding temperature. This temperature is maintained until the main switch 110 is opened to terminate oven operation.

To summarize operation of the oven, the user turns on the switch 110 and adjusts the timer, holding and roasting temperatures to a desired setting. When the timer 136 times out, the control of the oven temperature transfers from the potentiometer 148 to the holding potentiometer 146. Oven operation is terminated when the user opens the switch 110, which closes the valve 38 ending all burner operation.

Although the present design has been described with a degree of particularity, it is possible that certain design modifications or alterations could be envisioned by a skilled artisan. It is the intent, therefore, that all such modifications or alterations falling within the spirit or scope of the appended claims be protected.

I claim:

1. A portable oven heating unit comprising:
   means defining first and second chambers sealed from each other and having a common boundary for conduction of heat between said chambers;
   a gas fired burner positioned to radiate energy into the first of said chambers, said burner producing a heated effluent which flows through said first chamber to an exhaust;
   heat transfer elements coupled to said common boundary in said first chamber such that radiant heat from said burner as well as convection heat from said effluent heats both said elements and said boundary;
   a first fan for moving gas to be combusted and air to said burner and moving effluent and air through said first chamber to promote heat transfer from said effluent and air in said first chamber to said heat transfer elements and said boundary; and
   a second fan to promote heat transfer away from said boundary through said second chamber by moving air into contact with said boundary.

2. The apparatus of claim 1 which further comprises a plurality of additional heat transfer elements coupled to said boundary and positioned in said second zone to promote heat transfer through said second chamber.

3. The apparatus of claim 1 wherein the heat transfer elements in said first chamber comprise elongated fins extending away from said boundary toward said source of radiant energy.

4. A removable oven heating unit comprising:
   a plenum having a surface for conduction of heat away from said heat exchanger;

a gas burner mounted near said plenum to radiate infra-red energy into said plenum, said burner producing a waste effluent which heats air in said plenum by convection;

a plurality of heat absorbing fins mounted to said plenum surface to absorb heat radiated from said source as well as heat carried away from said source by said effluent;

a plurality of heat transmitting fins mounted to an opposed side of said surface from said heat absorbing fins for aiding heat transfer away from said heat exchanger unit;

an exhaust duct coupled to said plenum and forming a serpentine path leading to an exhaust port for said waste;

means defining a passageway for directing air heated by the heat transmitting fins to a cooking chamber, said passageway sharing a common boundary with said exhaust duct;

a first fan for promoting combustible gas and air flow to and through the plenum; and a second fan for promoting air flow past said heat transmitting fins through said passageway to the cooking chamber.

5. A top mounted heating unit for a portable oven comprising:

a gas fired infra-red burner which produces an infra-red radiation when gas is combusted and which also produces a heated waste product which heats the air in contact with said burner;

a fan for delivering gas and air to said burner;

means for igniting gas delivered to said burner;

a heat exchange unit positioned beneath said burner and on which said burner is mounted, said burner and heat exchange unit removable as a unit from said heating unit, said heat exchange unit defining first and second chambers separated by a common heat conducting barrier, said burner mounted to direct said radiation and said waste product into said first chamber toward said barrier;

a number of heating elements mounted to opposite sides of said barrier so that at least some of those elements in said first chamber are heated by both the radiation and the heated waste while those elements mounted to said barrier in said second chamber are heated by heat conduction through said barrier;

one or more fans for causing air to flow past said elements in said second chamber to transfer heat to said air;

ducting leading from said second chamber to an interior space of said oven to route heated air from the heat exchange unit to said interior space; and means for holding said heating unit in place atop said oven so that said ducting mates with said oven.

6. The heating unit of claim 5 wherein said first chamber defines a winding path along which heated air and the waste product is routed, said winding path ending with an outlet which exhausts said air to the atmosphere.

7. The unit of claim 6 wherein said winding path, at least in part, is bounded above and below by said second chamber so that the temperature of the heated air and waste product routed along said winding path is reduced to approximately the temperature inside said second chamber before they are exhausted to the atmosphere.

8. The heating unit of claim 5 wherein said heating elements comprise narrow fins which increase the surface area of metal in contact with the air circulating through said second chamber.

9. A portable oven heating unit comprising:

first and second chambers defining first and second heating zones having a common boundary for conduction of heat between said zones;

a source of radiant energy positioned to radiate energy into the first of said zones, said source producing a heated effluent which also flows through said first zone;

heat transfer elements thermally coupled to said common boundary and positioned in said first zone to be heated by radiant heat from said source and also heated by convection heating through contact with said effluent; and said second chamber having an inlet and outlet coupleable with a heating chamber for routing heat flowing through said boundary into said heating chamber; and said first chamber defining a serpentine passageway ending with an exhaust for the effluent, said first chamber partially bounded above and below by said second chamber so that the temperature of said effluent is lowered when it reaches the exhaust by lower temperature gases inside said second chamber.

* * * * *